(12) United States Patent
Wokurka et al.

(10) Patent No.: US 10,964,226 B2
(45) Date of Patent: Mar. 30, 2021

(54) INSTRUCTIONAL ASSESSMENT SYSTEM FOR A VEHICLE

(71) Applicant: The Boeing Company, Chicago, IL (US)

(72) Inventors: John Wokurka, Fenton, MO (US); Tim Stumpf, Foristell, MO (US); Elizabeth Marie Biddle, Orlando, FL (US); Clifford B. Sowadski, Eureka, MO (US)

(73) Assignee: The Boeing Company, Chicago, IL (US)

( * ) Notice: Subject to any disclaimer, the term of this patent is extended or adjusted under 35 U.S.C. 154(b) by 796 days.

(21) Appl. No.: 14/599,766

(22) Filed: Jan. 19, 2015

(65) Prior Publication Data

US 2016/0210871 A1 Jul. 21, 2016

(51) Int. Cl.
*G09B 9/24* (2006.01)
*B60W 50/14* (2020.01)
(Continued)

(52) U.S. Cl.
CPC .............. *G09B 9/24* (2013.01); *B60W 40/08* (2013.01); *B60W 40/09* (2013.01); *B60W 50/14* (2013.01);
(Continued)

(58) Field of Classification Search
CPC .......... G09B 9/24; B60W 50/14; B64D 43/02
(Continued)

(56) References Cited

U.S. PATENT DOCUMENTS 4,442,491 A 4/1984 Olhausen, Jr.
4,599,070 A 7/1986 Hladky et al.
(Continued)

FOREIGN PATENT DOCUMENTS

EP 0399418 A2 11/1990
EP 0969439 A2 1/2000
(Continued)

OTHER PUBLICATIONS

Fenton, "Simulation Control System for an Integrated Live and Simulation Environment for an Aircraft," U.S. Appl. No. 12/968,494, filed Dec. 15, 2010, 75 pages.
(Continued)

*Primary Examiner* — Robert P Bullington
(74) *Attorney, Agent, or Firm* — Yee & Associates, P.C.

(57) ABSTRACT

A method and apparatus for assessing performance of an operation for a vehicle. Real-time information is received by a computer system in the vehicle from at least one of a vehicle operator or a group of hardware systems in the vehicle during the operation for the vehicle. The performance of the vehicle operator in performing the operation is determined by from the real-time information. A graphical image of the feedback is displayed in a display system in the vehicle during the operation in which the graphical image provides guidance in operating the vehicle to perform the operation. The graphical image of the feedback comprises a graphical indicium of a corrective action for the correcting operation of the vehicle while carrying out the operation of the vehicle in which the graphical indicium enables improving performance of the operation of the vehicle by the vehicle operator.

20 Claims, 11 Drawing Sheets

(51) Int. Cl.
*G09B 9/06* (2006.01)
*G09B 9/08* (2006.01)
*G09B 9/02* (2006.01)
*B60W 40/08* (2012.01)
*B60W 40/09* (2012.01)

(52) U.S. Cl.
CPC .............. *G09B 9/02* (2013.01); *G09B 9/06* (2013.01); *G09B 9/08* (2013.01); *B60W 2050/146* (2013.01); *B60Y 2300/52* (2013.01); *Y02T 10/40* (2013.01); *Y02T 10/84* (2013.01)

(58) Field of Classification Search
USPC .......................................................... 434/29
See application file for complete search history.

(56) References Cited

U.S. PATENT DOCUMENTS

| | | | |
|---|---|---|---|
| 4,914,697 | A | 4/1990 | Dabbish et al. |
| 5,616,030 | A | 4/1997 | Watson |
| 5,807,109 | A | 9/1998 | Tzidon et al. |
| 6,106,297 | A | 8/2000 | Pollak et al. |
| 7,098,913 | B1 | 8/2006 | Etherington et al. |
| 8,572,390 | B2 | 10/2013 | Leclercq et al. |
| 8,616,883 | B2 | 12/2013 | Wokurka |
| 8,616,884 | B1 | 12/2013 | Lechner et al. |
| 2003/0046396 | A1 | 3/2003 | Richter et al. |
| 2003/0206119 | A1* | 11/2003 | Riley ................... G05D 1/0055 340/963 |
| 2006/0178758 | A1 | 8/2006 | Koriat |
| 2007/0264617 | A1 | 11/2007 | Richardson et al. |
| 2008/0194916 | A1* | 8/2008 | Limma .............. A61B 5/02438 600/300 |
| 2008/0206719 | A1 | 8/2008 | Johnsson et al. |
| 2009/0089580 | A1 | 4/2009 | Sugikawa |
| 2010/0013927 | A1 | 1/2010 | Nixon |
| 2011/0171611 | A1 | 7/2011 | Batcheller et al. |
| 2011/0313658 | A1 | 12/2011 | He |
| 2012/0110077 | A1 | 5/2012 | Merchant et al. |
| 2012/0156653 | A1 | 6/2012 | Wokurka |
| 2012/0204059 | A1 | 8/2012 | Preston |
| 2014/0113255 | A1 | 4/2014 | Lechner et al. |
| 2014/0170601 | A1 | 6/2014 | Wokurka et al. |
| 2015/0269860 | A1* | 9/2015 | Shaw ....................... G09B 9/08 434/35 |

FOREIGN PATENT DOCUMENTS

| | | |
|---|---|---|
| JP | H08276074 A | 10/1996 |
| WO | 2012082242 A2 | 6/2012 |

OTHER PUBLICATIONS

Fenton et al., "Data Sharing System for Aircraft Training," U.S. Appl. No. 13/713,175, filed Dec. 13, 2012, 76 pages.
Lechner et al., "Integrated Live and Simulation Environment System for an Aircraft," U.S. Appl. No. 14/141,761, filed Dec. 27, 2013, 62 pages.
Bertino et al., "Secure and selective dissemination of XML documents," ACM Transactions on Information and System Security (TISSEC), Aug. 2002, pp. 290-331.
Kaushik et al., "Policy-Based Dissemination of Partial Web-Ontologies," Proceedings of the 2005 ACM Workshop on Secure Web Services (SWS'05), Nov. 2005, pp. 43-52.
Lechner et al., "Integrated Live and Simulation Environment System for an Aircraft," U.S. Appl. No. 13/304,514, filed Nov. 25, 2011, 78 pages.
Lechner et al., "Integrated Live Virtual Constructive Technologies Applied to Tactical Aviation Training," Proceedings of the Interservice/Industry Training, Simulation, and Education Conference (I/ITSEC), Nov. 2008, 11 pages.
Mendro et al., "Integrated Live and Simulation Environment System for an Aircraft," U.S. Appl. No. 12/628,831, filed Dec. 1, 2009, 62 pages.
Rahaman et al., "Towards Secure Content Based Dissemination of XML Documents," Fifth International Conference on Information Assurance and Security (IAS'09), Aug. 2009, pp. 721-724.
Sowadski et al., "Occlusion Server for an Integrated Live and Simulation Environment for an Aircraft," U.S. Appl. No. 12/880,701, filed Sep. 13, 2012, 79 pages.

* cited by examiner

| | Loop: ○ | A1 ▲ | Step1 | Step2 | Step3 | Step4 |
|---|---|---|---|---|---|---|
| | | Student | | | Expert | |
| TTC | | 0.0 | + | | 0.0 | |
| Speed | | 0.0 | + | | 0.0 | |
| Altitude | | 0.0 | − | | 0.0 | |
| Pitch | | 0.0 | + | | 0.0 | |
| Roll | | 0.0 | − | | 0.0 | |

INSTRUCTIONAL ASSESSMENT SYSTEM FOR A VEHICLE

BACKGROUND INFORMATION

1. Field

The present disclosure relates generally to vehicles, and in particular, to a method and apparatus for providing training for vehicles. Still more particularly, the present disclosure provides a method and apparatus for providing real-time visual feedback to guide a vehicle operator to perform an operation for a vehicle.

2. Background

Training an operator to operate a vehicle may be performed using a number of different techniques. For example, the operator may operate the vehicle under the guidance of an instructor. A large amount of training may be performed in a classroom and using training devices on the ground. For example, with the aircraft, these training devices often take the form of flight simulators. A flight simulator is a system that copies or simulates the experience of flying an aircraft. A flight simulator is meant to make the experience as real as possible. Flight simulators may range from controls and a display in a room to a full-size replica of a cockpit mounted on actuators that are configured to move the cockpit in response to actions taken by a pilot. These types of simulators provide a capability to teach pilots, other crew members, or some combination thereof to operate various aircraft systems and to react to different events.

Additional training is performed through training exercises using live aircraft. These types of training exercises expose pilots to the actual conditions encountered when flying an aircraft. Various conditions cannot be accurately simulated using a flight simulator. For example, the actual movement or forces encountered in flying an aircraft may not be adequately provided through a flight simulator. In many cases, an instructor may be present in the aircraft with the pilot. The instructor may perform an assessment of how well a pilot performs different operations in operating the aircraft. The assessment cannot be completed until after the training session. The instructor may be able to focus on some aspects of an operation being performed by the pilot but unable to view or evaluate other aspects as to how the pilot performs an operation. Other information that may be needed for the assessment is stored in a data recorder, and aircraft. The instructor is unable to access the information to complete the assessment until after the flight.

After the flight, data recorded during the training session is downloaded from the data recorder in the aircraft and sent to a debriefing station. The pilot determines how well an operation was performed at the debriefing station. This process is lengthy and more time-consuming than desired.

The feedback received at the debriefing station may include a score on how well the pilot performed an operation. Additionally, the feedback also may include guidance or information indicating corrections to the manner in which the operation was performed. This type of feedback may be used by the pilot in performing the operation in the aircraft during a subsequent training session in the aircraft.

This type of training may increase the number of training sessions needed by the pilot. The increase in the number of training sessions increases the cost and time needed for the pilot to be able to operate the aircraft without the need for additional training.

Therefore, it would be desirable to have a method and apparatus that take into account at least some of the issues discussed above, as well as other possible issues. For example, it would be desirable to have a method and apparatus that provide feedback to an operator of a vehicle, such as a pilot of an aircraft, more quickly than with current training techniques.

SUMMARY

An embodiment of the present disclosure provides an apparatus comprising a display system and an assessment system in communication with the display system. During operation of a vehicle, the assessment system receives real-time information from at least one of a vehicle operator or a group of hardware systems in the vehicle during the operation. The assessment system determines a performance of the vehicle operator in performing the operation from the real-time information. The assessment system also generates a feedback based on the performance of the vehicle operator. Further, the assessment system displays a graphical image of the feedback in the display system during the operation in which the graphical image provides guidance in operating the vehicle to perform the operation. The graphical image of the feedback comprises a graphical indicium of a corrective action for correcting the operation for the vehicle while carrying out the operation for the vehicle in which the graphical indicium enables improving the performance of the operation for the vehicle by the vehicle operator.

Another embodiment of the present disclosure provides a method for assessing a performance of an operation for a vehicle. Real-time information is received by a computer system in the vehicle from at least one of a vehicle operator or a group of hardware systems in the vehicle during the operation of the vehicle. The performance of the vehicle operator in performing the operation is determined by the computer system from the real-time information. A feedback is generated by the computer system based on the performance of the vehicle operator identified. A graphical image of the feedback is displayed by the computer system in a display system in the vehicle during the operation. The graphical image provides guidance to perform the operation. The graphical image of the feedback comprises a graphical indicium of a corrective action for correcting the operation of the vehicle while carrying out the operation for the vehicle. The graphical indicium enables improving the performance of the operation for the vehicle by the vehicle operator.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. The illustrative embodiments recognize and take into account that in training a vehicle operator to perform an operation for a vehicle, currently available techniques and systems do not allow for obtaining feedback as quickly as desired. In particular, the illustrative embodiments recognize and take into account that currently used techniques provide the feedback after the live training session in the aircraft. The pilot may then perform additional training in another training session in the aircraft at a later time. This time delay may make learning to perform the operation in a desired manner more difficult and time-consuming than desired for the pilot.

Thus, the illustrative embodiments provide a method and apparatus for assessing performance of an operation for a vehicle. In one illustrative embodiment, a computer system in the vehicle receives real-time information from at least one of a vehicle operator or a group of hardware systems in the vehicle during the operation for the vehicle. The computer system determines a performance of the vehicle operator in performing the operation from the real-time information. The computer system also generates a feedback based on the performance of the vehicle operator identified. The computer system displays a graphical indicium of the feedback in a display system in the vehicle during the operation in which the graphical image provides guidance to at least one of the vehicle operator or an instructor in operating the vehicle to perform the operation. The graphical image of the feedback comprises a graphical indicium of a corrective action for correcting operation of the vehicle during the performance of the operation for the vehicle that enables improving performance of the operation for the vehicle by the operator.

Figure 1:
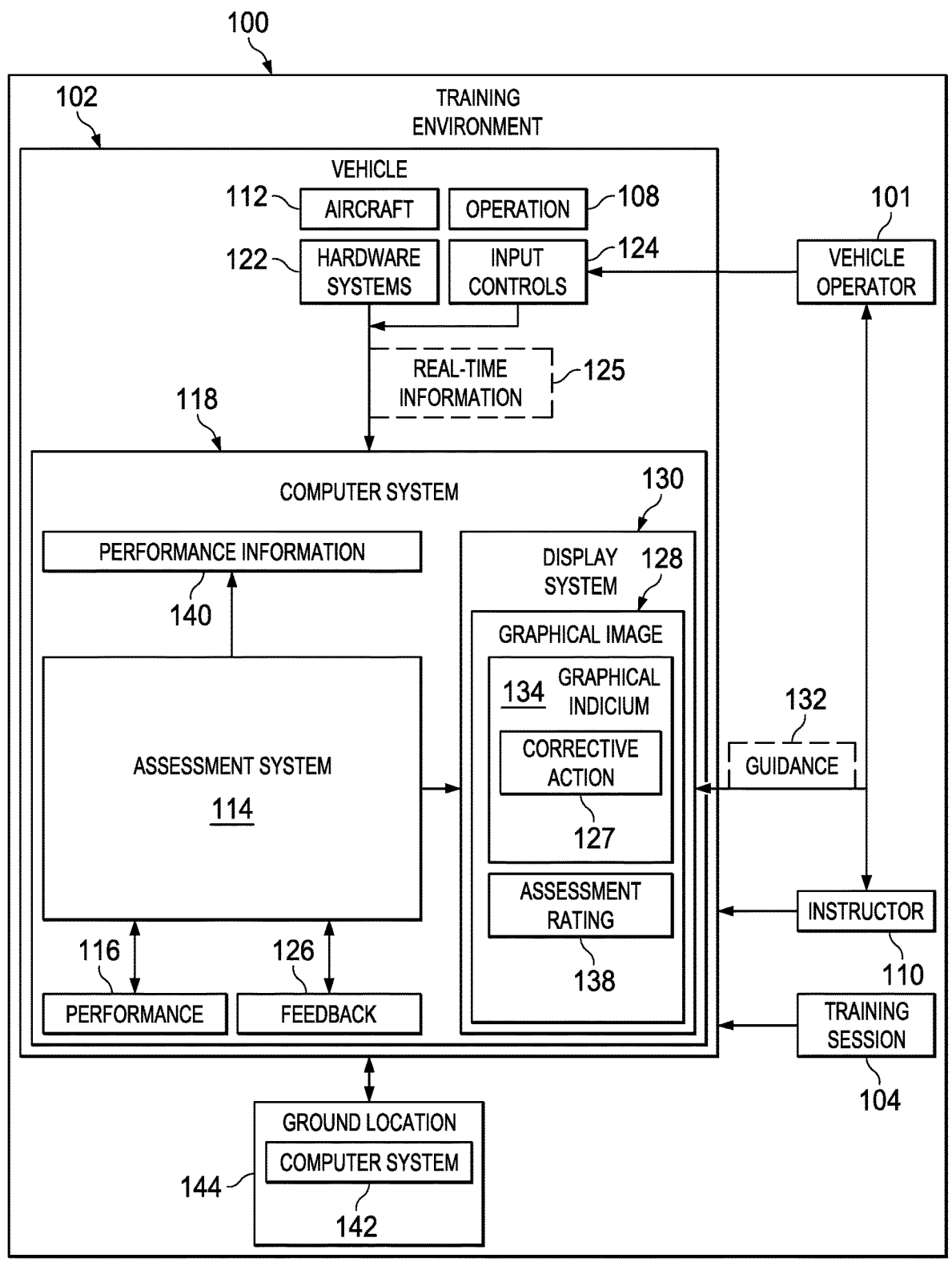
FIG. 1 is an illustration of a training environment in accordance with an illustrative embodiment.

With reference now to the figures, and in particular, with reference to FIG. 1, an illustration of a training environment is depicted in accordance with an illustrative embodiment. In this illustrative example, training environment 100 is an example of one environment in which an illustrative embodiment may be implemented to provide feedback to instructor 110 or vehicle operator 101.

As depicted, training environment 100 includes vehicle 102. Vehicle 102 is a physical vehicle (and not merely a simulator) that is used for training session 104 to perform training. In particular, vehicle operator 101 performs operation 108 performed for vehicle 102 during training session 104. In the illustrative example, instructor 110 also may be present in vehicle 102 during training session 104.

In this illustrative example, vehicle 102 may take various forms. For example, vehicle 102 may be selected from one of a mobile platform, an aircraft, a surface ship, a truck, an automobile, a tank, a personnel carrier, a train, a spacecraft, a submarine, a bus, an automobile, or some other suitable type of vehicle.

As depicted, operation 108 performed for vehicle 102 also may take various forms. When vehicle 102 takes the form of aircraft 112, operation 108 may include at least one of a maneuver, a take-off, a landing, cruising, a change of altitude, setting a waypoint, a roll, a turn, changing a position of an airfoil, or some other suitable type of operation. In the illustrative example, aircraft 112 may be, for example, an airplane, a commercial aircraft, a military aircraft, a rotorcraft, or some other suitable type of aircraft.

As used herein, the phrase "at least one of," when used with a list of items, means different combinations of one or more of the listed items may be used and only one of each item in the list may be needed. In other words, "at least one of" means any combination of items and number of items may be used from the list but not all of the items in the list are required. The item may be a particular object, thing, or a category.

For example, without limitation, "at least one of item A, item B, or item C" may include item A, item A and item B, or item B. This example also may include item A, item B, and item C, or item B and item C. Of course, any combinations of these items may be present. In some illustrative examples, "at least one of" may be, for example, without limitation, two of item A; one of item B; and ten of item C; four of item B and seven of item C; or other suitable combinations.

In the illustrative example, assessment system 114 determines performance 116 of vehicle operator 101. Assessment system 114 may be implemented in software, hardware, firmware or a combination thereof. When software is used, the operations performed by assessment system 114 may be implemented in program code configured to run on hardware, such as a processor unit. When firmware is used, the operations performed by assessment system 114 may be implemented in program code and data and stored in persistent memory to run on a processor unit. When hardware is employed, the hardware may include circuits that operate to perform the operations in assessment system 114.

In the illustrative examples, the hardware may take the form of a circuit system, an integrated circuit, an application-specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

As depicted, assessment system 114 may be implemented in computer system 118 in vehicle 102. Computer system 118 is a hardware system which includes one or more data processing systems. When more than one data processing system is present, those data processing systems may be in communication with each other using a communications medium. The communications medium may be a network. In another illustrative example, when vehicle 102 is aircraft 112, the communications medium may be a communications bus. For example, the communications bus may provide communications between at least one of assessment system 114, hardware systems 122, input controls 124, or other suitable components in aircraft 112. Hardware systems 122 may include a flight control system, a sensor system, an environmental system, an engine control system, or some other suitable hardware system in aircraft 112. The data processing systems may be selected from at least one of a computer, a server computer, a tablet, or some other suitable data processing system.

In the illustrative example, assessment system 114 determines performance 116 of vehicle operator 101 performing operation 108 during operation 108. In other words, performance 116 may be identified while operation 108 is performed by vehicle operator 101 operating vehicle 102.

During operation of vehicle 102, assessment system 114 receives real-time information 125 from at least one of vehicle operator 101 or a group of hardware systems 122 associated with operational control of vehicle 102.

As used herein, "a group of," when used with reference to items, means one or more items. For example, a group of hardware systems 122 is one or more of hardware systems 122.

In this illustrative example, real-time information 125 is information that is generated while an event occurs. In this illustrative example, real-time information 125 is received as quickly as possible without intended delays. As depicted, real-time information 125 from the group of hardware systems 122 associated with operational control of vehicle 102 may include at least one of an altitude, a yaw, a pitch, a roll, a velocity, a directional velocity, fuel use, engine temperature, radio or communication setting, heart rate of vehicle operator 101, blood pressure of vehicle operator 101, or other suitable information.

In the illustrative example, real-time information 125 may be received from vehicle operator 101 via a group of input controls 124 used by vehicle operator 101. In this example, an input control in the group of input controls 124 may be selected from one of a steering control or control stick, a rudder control, a switch, a touchscreen, or some other suitable type of control that may be used in performing operation 108 performed for aircraft 112.

As depicted, hardware systems 122 are hardware in vehicle 102 associated with operational control of the vehicle 102. When vehicle 102 is aircraft 112, hardware systems 122 may include computer system 118, which may be a flight control computer system, for example. Hardware systems 122 may include at least one of an environmental control system, a data bus or communication system for communicating vehicle guidance/directional control commands, a flight control system, a navigation system, a collision avoidance system, an engine control system, a sensor system, a biometric sensor system for vehicle operator 101, or other suitable types of systems or devices that may be located in aircraft 112.

In this illustrative example, assessment system 114 determines performance 116 of vehicle operator 101 in performing operation 108 from real-time information 125, which is obtained via communication of vehicle guidance/directional control commands from a flight control system, communication of engine operating information from an engine control system, data from sensors, or other real-time information related to vehicle operation. Assessment system 114 generates feedback 126 based on performance 116 of vehicle operator 101, as determined by assessment system 114 based on obtained real-time information. Feedback 126 may take the form of real-time feedback provided as quickly as possible during training session 104 when vehicle operator 101 performs operation 108.

For example, in generating feedback 126, assessment system 114 receives real-time information (e.g., vehicle guidance/directional control or engine information) and identifies corrective action 127 for improving performance 116 of operation 108 based on an evaluation of performance 116 of vehicle operator 101 in performing operation 108 as determined by assessment system 114 from real-time information 125. Using feedback 126, assessment system 114 generates graphical image 128 for communication of such feedback 126.

As depicted, assessment system 114 displays graphical image 128 of feedback 126 in display system 130 of vehicle 102 during operation 108. Assessment system 114 is in communication with display system 130. Display system 130 is a system within computer system 118 in this illustrative example. In this illustrative example, display system 130 is in communication with assessment system 114 via a communications medium such as a communications bus in computer system 118.

Assessment system 114 provides a visualization of feedback in display system 130 during training session 104 while vehicle operator 101 operates vehicle 102. Display system 130 is a hardware system that includes one or more display devices on which graphical image 128 may be displayed. Display system 130 may include at least one of a liquid crystal display (LCD), a light emitting diode (LED) display, an organic light emitting diode (OLED) display, or some other suitable type of display device.

Graphical image 128 provides guidance 132 in operating vehicle 102 to perform operation 108. In the illustrative example, guidance 132 may be provided to at least one of vehicle operator 101 or instructor 110. In this illustrative example, graphical image 128 of feedback 126 comprises graphical indicium 134 of corrective action 127 for correcting operation 108 for vehicle 102 while carrying out operation 108 of vehicle 102. In this manner, displaying graphical image 128 with graphical indicium 134 enables improving performance 116 of operation 108 of vehicle 102 by vehicle operator 101.

In this illustrative example, graphical indicium 134 is a group of graphical elements that are selected to provide a visualization of information to vehicle operator 101 in graphical form. Graphical indicium 134 may include at least one of an icon, an image, color, text, animation, or other suitable types of graphical elements.

As depicted, graphical image 128 comprising graphical indicium 134 of corrective action 127 may be viewed by at least one of vehicle operator 101 or instructor 110. Depending on the information being conveyed in graphical indicium 134, instructor 110 may view the information and provide instructions or feedback to vehicle operator 101. In other illustrative examples, vehicle operator 101 may view the display of graphical indicium 134 and perform the indicated corrective action 127.

Additionally, graphical image 128 also may provide a visualization or display of assessment rating 138. Assessment rating 138 is for vehicle operator 101 in performing operation 108 for vehicle 102.

As a result, computer system 118 operates as a special purpose computer system in which assessment system 114 associated with computer system 118 enables attaining a desired level of essentially real-time training for vehicle operator 101 in a manner that is faster than currently available techniques that provide debriefing feedback after operator 101 ceases operating vehicle 102. In particular, assessment system 114 transforms computer system 118 into a special purpose computer system as compared to currently available general computer systems that do not have assessment system 114.

Additionally, computer system 118 performs a transformation of data. For example, assessment system 114 associated with computer system 118 determines performance 116 based on analysis and/or computations by assessment system 114 from real-time information 125. Real-time information 125 is information about at least one of control or operation-related information for vehicle 102 or vehicle operator 101. This information is transformed into information about how vehicle operator 101 performs operation 108 in the form of performance 116. In turn, performance 116 is used to identify feedback 126. In the illustrative example, feedback 126 includes graphical indicium 134 and corrective action 127.

In this manner, vehicle operator 101 viewing the display of graphical image 128 including graphical indicium 134 may perform corrective action 127 in operating vehicle 102 in a manner that improves performance 116 for operation 108. This improvement in performance 116 for operation 108 occurs during training session 104.

As result, the reduction in the number of training sessions may occur through the use of assessment system 114. For example, another route or an additional performance of operation 108 occurred during training session 104. In this manner, fewer training sessions in vehicle 102 may occur with the use of assessment system 114.

Thus, with an illustrative embodiment, at least one of vehicle operator 101 or instructor 110 may obtain feedback 126 on performance 116 of operation 108 for vehicle 102 while vehicle operator 101 performs operation 108. Additionally, feedback 126 may allow for improvements in performing operation 108 while operation 108 occurs. Additionally, feedback 126 also may be used to provide guidance 132 for vehicle operator 101 to perform operation 108 again during the same training session in vehicle 102 or in a later training session. In this manner, learning how to perform operation 108 by vehicle operator 101 may occur more quickly and efficiently with feedback 126 occurring during the same training session.

Additionally, assessment system 114 may record real-time information 125 in computer system 118. When stored for later use, real-time information 125 is performance information 140. In this illustrative example, performance information 140 may be downloaded to computer system 142 at ground location 144. Performance information 140 may be downloaded during operation of vehicle 102 in training session 104 or after training session 104 is completed. Performance information 140 may provide additional feedback to vehicle operator 101. Performance information 140 may be reviewed by instructor 110 for additional assessment of vehicle operator 101. This type of review of performance information 140 may be more akin to currently used techniques at debriefing stations. In this manner, assessment system 114 may provide feedback both during performance of training session 104 and after completion of training session 104.

Figure 2:
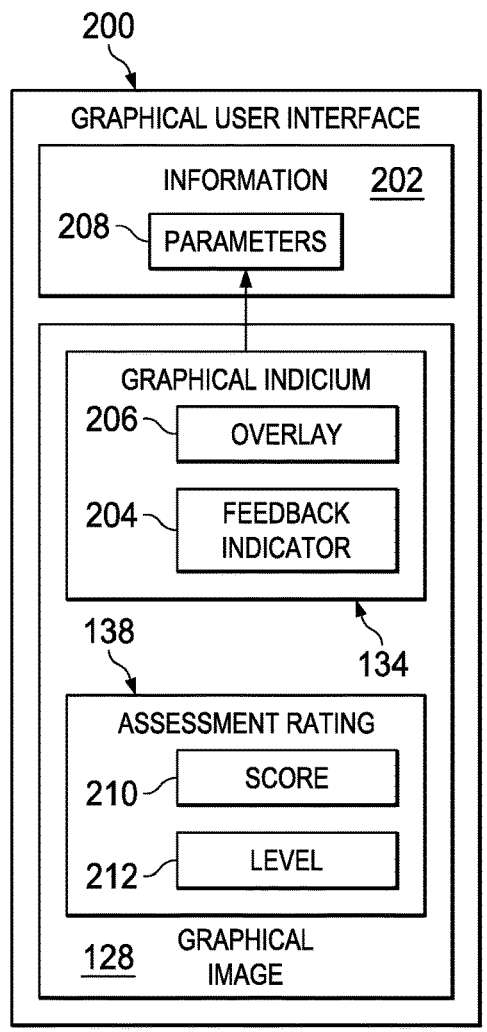
FIG. 2 is an illustration of a block diagram of a display system in accordance with an illustrative embodiment.

Turning next to FIG. 2, an illustration of a block diagram of a display system is depicted in accordance with an illustrative embodiment. As depicted, graphical user interface 200 may be displayed in display system 130 of FIG. 1. Graphical user interface 200 may be displayed by the group of hardware systems 122 of FIG. 1.

In the illustrative examples, the same reference numeral may be used in more than one figure. This reuse of a reference numeral in different figures represents the same element in the different figures.

In the illustrative example, corrective action 127 may be displayed as graphical indicium 134 in graphical image 128. Corrective action 127 is displayed using graphical indicium 134 and may be used by vehicle operator 101 to change the manner in which operation 108 is performed in a manner that increases performance 116 of operation 108. In other words, corrective action 127 may performed during operation 108 to increase performance 116 based on the display of corrective action 127 in graphical indicium 134 in display system 130. In the illustrative example, corrective action 127 displayed as graphical indicium 134 may be used by instructor 110 in addition to or in place of vehicle operator 101. When graphical indicium 134 is displayed to instructor 110, instructor 110 may then provide feedback 126 to vehicle operator 101.

In some cases, it may be undesirable for vehicle operator 101 to view graphical image 128 in addition to other information in display system 130. For example, a beginning pilot may be more distracted than desired by graphical image 128. In this example, instructor 110 is present and may view corrective action 127 in graphical indicium 134 in graphical image 128 and provide directions to vehicle operator 101. In contrast, an experienced pilot performing operation 108 during training session 104 may not need instructor 110, and may not be undesirably distracted when viewing corrective action 127 in graphical indicium 134 in graphical image 128 in display system 130.

As depicted, graphical user interface 200 displays information 202 from hardware systems 122 of FIG. 1. Information 202 may include real-time information 125. The display of information 202 may be used by vehicle operator 101 to perform operation 108.

Additionally, graphical image 128, including graphical indicium 134, also may be displayed in graphical user interface 200 as displayed in display system 130 by the group of hardware systems 122. In this illustrative example, graphical indicium 134 is feedback indicator 204 providing guidance 132 to vehicle operator 101 to adjust at least one of speed, direction or heading, position, attitude, altitude of the aircraft, an engine control setting, a radio or communication systems setting, a setting for the group of hardware systems in performing a maneuver, or some other suitable adjustment in operation 108 for aircraft 112.

In one illustrative example, assessment system 114 of FIG. 1 may display graphical indicium 134 as overlay 206 to graphical user interface 200 for vehicle 102. For example, corrective action 127 may be displayed as graphical indicium 134 overlaid on a display of a group of parameters 208 in information 202 displayed in graphical user interface 200 for operation 108 of vehicle 102. As depicted, the group of parameters 208 includes an altitude for aircraft 112, for example. In this particular example, graphical indicium 134 may indicate at least one of a desired altitude or a value of the desired altitude.

Other examples of corrective action/feedback that may be displayed as graphical indicium for a vehicle operator include, but are not limited to, an indication that current speed is approaching stall condition, a desired speed, an indication that angle of attack exceeds a desired level, a desired radio channel or setting, an indication of a phase of landing, a desired heading, a desired altitude, a desired change in pitch, a desired change in roll, throttle setting, a desired rate of altitude increase, a desired rate of altitude decrease, a desired radar setting, and other suitable types of corrective actions or feedback.

In this illustrative example, graphical image 128 also may include assessment rating 138. As depicted, assessment rating 138 may be, for example, a graphical display of score 210 or other indication of level 212 of performance 116 for vehicle operator 101 of an operation of vehicle 102 or aircraft 112. In the illustrative example, indication of level 212 may include, for example, performance data, or other useful information that may indicate level 212 for performance 116.

Figure 3:
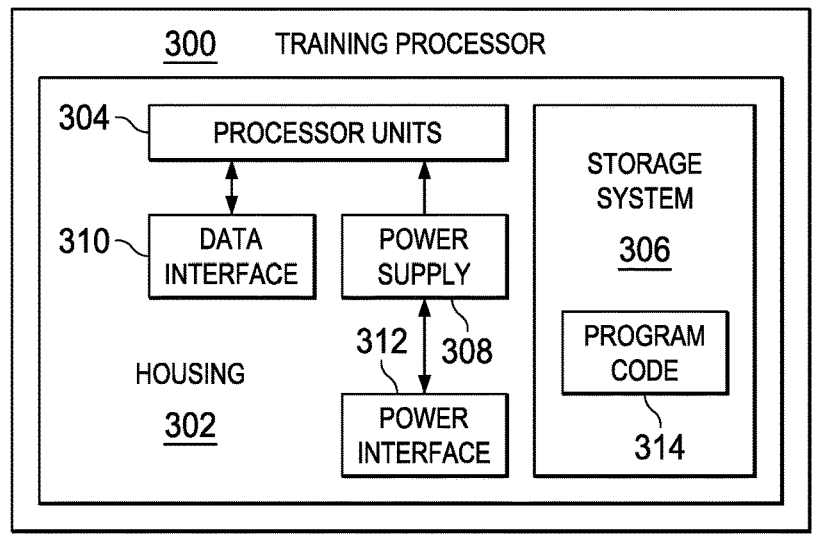
FIG. 3 is an illustration of a block diagram of a training processor in accordance with an illustrative embodiment.

Turning now to FIG. 3, an illustration of a block diagram of a training processor is depicted in accordance with an illustrative embodiment. In this illustrative example, training processor 300 is an example of hardware that may be used to implement assessment system 114 in computer system 118 in FIG. 1. As depicted, training processor 300 comprises housing 302, a group of processor units 304, storage system 306, power supply 308, data interface 310, and power interface 312.

As depicted, housing 302 is a physical structure configured to hold the different components for training processor 300. In one illustrative example, housing 302 is configured to be moveable or removable with respect to vehicle 102 in FIG. 1. For example, housing 302 may have a shape and size configured for placement into a pod that may be attached to vehicle 102 or other structure in vehicle 102. In other words, the pod may be removably attached to vehicle 102.

Each processor unit in the group of processor units 304 may include one or more processors. These processors are configured to run program code 314 stored in storage system 306. Program code 314 is program code for assessment system 114 in this illustrative example. Additionally, program code 314 may include other processes such as those for simulations that may be performed during training session 104 using vehicle 102.

Storage system 306 comprises one or more storage devices. Storage system 306 may include, for example, at least one of a hard disk drive, a random access memory, a read only memory, a solid state drive, and other suitable types of storage devices.

Power supply 308 may receive and condition power received through power interface 312. For example, power supply 308 may provide filtering, voltage conversion, and other suitable types of power processing. Data interface 310 provides communication with other components in computer system 118 in this illustrative example.

Figure 4:
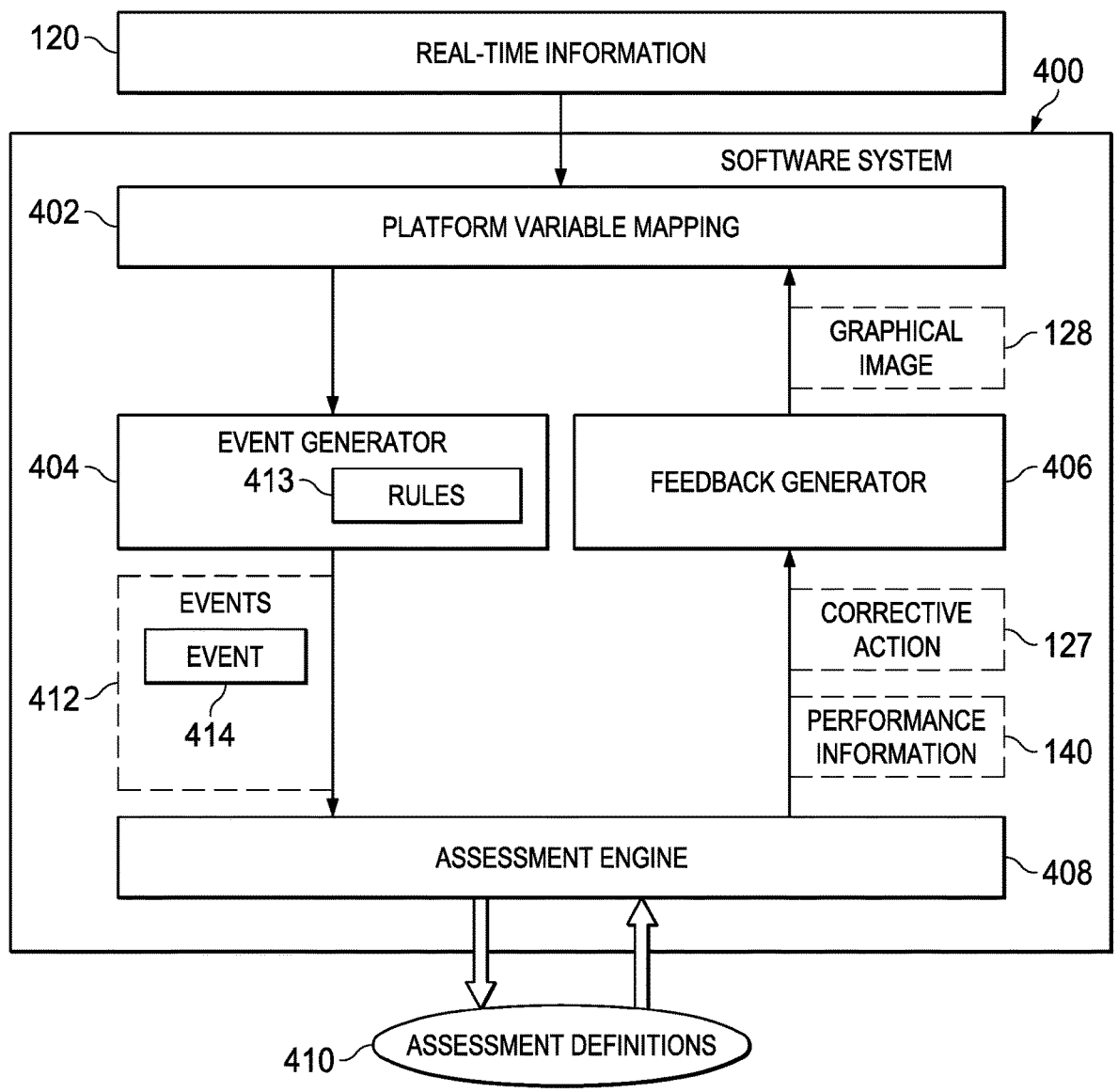
FIG. 4 is an illustration of a software system that may be used to implement an assessment system in accordance with an illustrative embodiment.

Turning next to FIG. 4, an illustration of a software system that may be used to implement an assessment system is depicted in accordance with an illustrative embodiment. In this illustrative example, software system 400 is an example of software components that may be used to implement assessment system 114 in FIG. 1. The software components may be implemented in hardware, such as training processor 300 in FIG. 3.

In this illustrative example, software system 400 includes a number of different components. As depicted, software system 400 includes platform variable mapping 402, event generator 404, feedback generator 406, assessment engine 408, and assessment definitions 410.

As depicted, platform variable mapping 402 is an interface to other hardware components such as those in computer system 118, hardware systems 122, or some combination thereof. Platform variable mapping 402 may receive real-time information 125 from a communications medium such as a communications bus. In this illustrative example, platform variable mapping 402 converts the information received over a communications bus from hardware systems 122 in FIG. 1 into a form usable by different components in software system 400. As depicted, the conversion of information may be into a form that is usable by at least one of event generator 404 or assessment engine 408.

In the illustrative example, event generator 404 generates events 412 for assessment engine 408. For example, event generator 404 may process information received from platform variable mapping 402 to determine when an event is present for processing by assessment engine 408. As depicted, event generator 404 may include rules 413. Rules 413 may be used to identify events, particular types of data, or other information that is of interest for use by assessment engine 408.

For example, rules 413 may include a rule that looks for real-time information 125 indicating that the altitude of aircraft 112 in FIG. 1 is below 20,000 feet. Another rule in rules 413 may send the speed of aircraft 112 to assessment engine 408 every 10 seconds. As another illustrative example, another rule may identify when aircraft 112 is 30 miles away from a runway at an altitude of 10,000 feet. This information may indicate a particular phase of land landing is occurring. In this example, event generator 404 sends event 414 in events 412 that a particular phase of landing is present.

In another illustrative example, event generator 404 may generate events 412 based on real-time information 125 received that includes biometrics of vehicle operator 101. For example, event generator 404 may generate event 414 when a heartbeat rate of vehicle operator 101 is greater than a selected value, a blood pressure of vehicle operator 101 is greater than a selected value, a direction at which vehicle operator 101 is looking, or some other suitable information.

As depicted, assessment engine 408 identifies performance 116 of vehicle operator 101 based on the events 412 received from event generator 404. The identification of performance 116 in FIG. 1 is identified using assessment definitions 410 in this illustrative example. As depicted, assessment definitions 410 may include at least one of rules, analysis processes, evaluation processes, data, or other processes that may be used to identify performance 116 for vehicle operator 101. Assessment definitions 410 may take the form of scripts, program code, or other suitable forms.

In the illustrative example, assessment engine 408 may determine whether tasks for steps performed for operation 108 are being performed in a desired manner. For example, assessment engine 408 may look for a group of values in events 412 received from event generator 404 to determine whether the group of values is within a standard or sufficiently close to some desired value or group of values. Assessment engine 408 may generate performance information 140 based on the comparison. Performance information 140 may be a score, a pass fail limitation, or some other suitable information indicating the performance of the operator for the particular operation being assessed.

For example, assessment engine 408 may examine events 412 that identify the position and direction of travel of an aircraft. This information in events 412 may be used to determine whether the aircraft is within a flight envelope desired for the aircraft.

Additionally, assessment engine 408 may identify corrective action 127. For example, if the aircraft is not within the flight envelope, corrective action 127 identifying a change in direction, altitude, or other change in parameter may be identified for the aircraft. Assessment engine 408 may include at least one of a knowledge base, an artificial intelligence system, or some other mechanism to identify corrective action 127 from events 412.

In this illustrative example, assessment engine 408 sends at least one of performance information 140 or corrective action 127 to feedback generator 406. As depicted, feedback generator 406 formats at least one of the performance information or corrective action for presentation. For example, feedback generator 406 may generate graphical image 128 including at least one of the performance information 140 or corrective action 127 for display on display system 130 in FIG. 1 to vehicle operator 101, instructor 110, or to both vehicle operator 101 and instructor 110.

Feedback generator 406 sends graphical image 128 to platform variable mapping 402. In turn, platform variable mapping 402 formats graphical image 128 as needed so that graphical image 128 may be displayed on display system 130 in aircraft 112.

In this manner, software system 400 includes processes that monitor the performance of vehicle operator 101. Additionally, software system 400 also may allow creation, configuration, and modification of assessment definitions 410 such that the performance of vehicle operator 101 may be identified for different operations that may be performed for vehicle 102, or other vehicles.

As a result, vehicle specific parameters for vehicle 102 may be compared to those desired for operation 108. The values for parameters desired for operation 108 may be based on the standard, regulation, or other source. For example, altitude, speed, and position may be compared to rules for altitude tolerance or speed tolerance in the illustrative example.

In the illustrative example, assessment system 114, using software system 400, provides real-time feedback pertaining to different metrics. This real-time feedback occurs during the performance of operation 108 by vehicle operator 101. The real-time feedback may be provided to at least one of vehicle operator 101 or instructor 110 during training session 104 in FIG. 1.

The illustration of training environment 100 and the different components in training environment 100 in FIGS. 1-4 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, although vehicle 102 has been described with respect to aircraft 112, vehicle 102 may take other forms. For example, vehicle 102 may be selected from one of a mobile platform, a surface ship, a truck, an automobile, a tank, a personnel carrier, a train, a spacecraft, a submarine, a bus, and an automobile.

As another example, assessment system 114 may be implemented in a laptop computer, or an electronic flight bag that is designed to receive real-time information 125 from at least one of hardware systems 122 or vehicle operator 101 via input controls 124.

Turning next to FIGS. 5-10, examples of graphical images displayed in graphical user interfaces in a display system for providing feedback on the performance of an operation by vehicle operator are shown in accordance with an illustrative embodiment. These different graphical images are examples of some implementations for graphical image 128 shown in block form in FIGS. 1 and 2.

Figure 5:
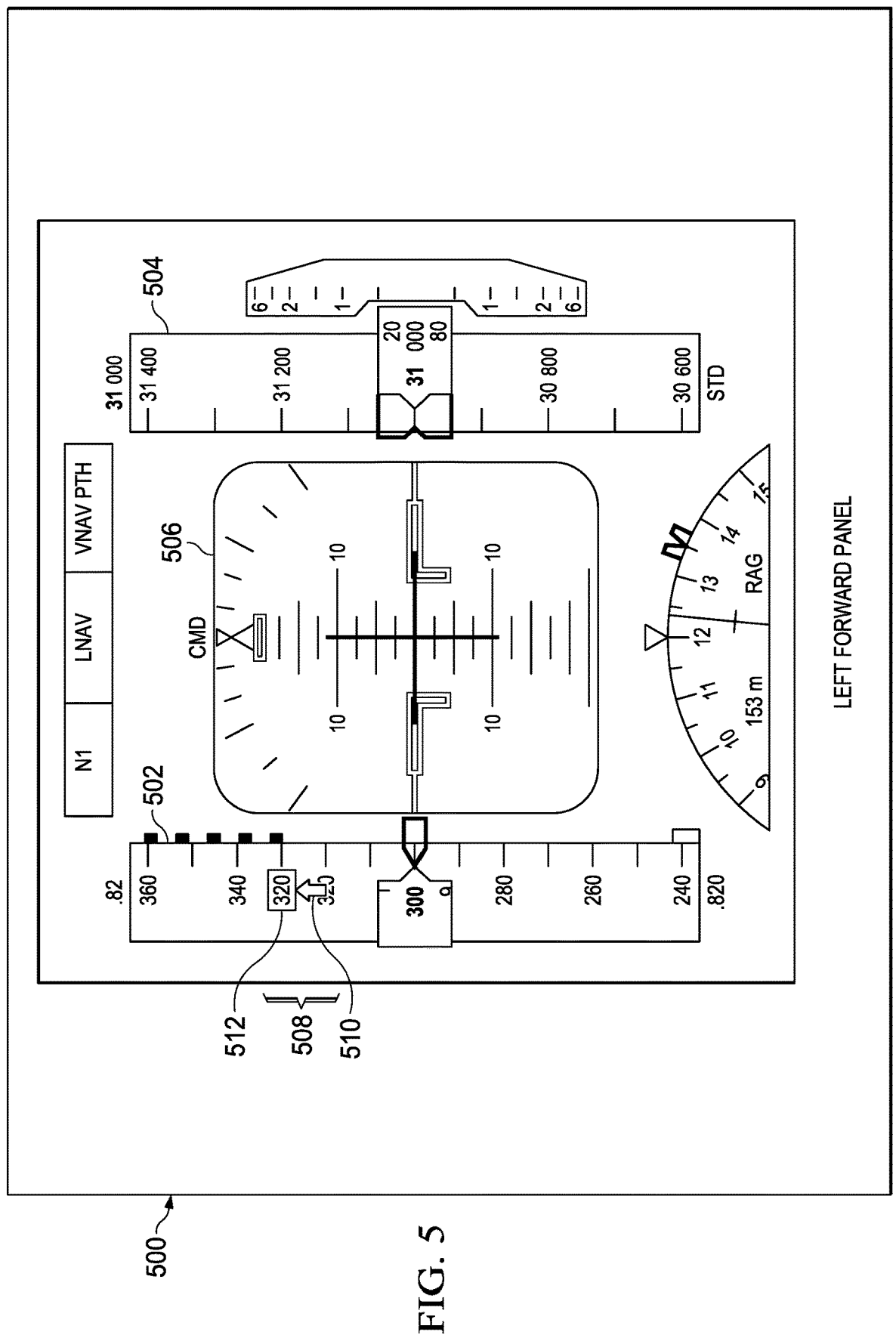
FIG. 5 is an illustration of a graphical user interface with a graphical indicium overlaid on information originating from a group of hardware systems in accordance with an illustrative embodiment.

With reference first to FIG. 5, an illustration of a graphical user interface with a graphical indicium overlaid on information originating from a group of hardware systems is depicted in accordance with an illustrative embodiment. In this illustrative example, graphical user interface 500 is an example of one implementation for graphical user interface 200 illustrated in FIG. 2.

In this illustrative example, section 502 in graphical user interface 500 includes information from various hardware systems in an aircraft. In this example, the information is real-time information received from the hardware systems.

For example, section 502 in graphical user interface 500 graphically indicates airspeed of the aircraft. As depicted, section 504 in graphical user interface 500 graphically indicates altitude for the aircraft. In the illustrative example, section 506 in graphical user interface 500 indicates attitude for the aircraft.

As depicted, graphical indicium 508 is displayed within graphical user interface 500. In this illustrative example, graphical indicium 508 overlays real-time information from hardware systems in the aircraft displayed in graphical user interface 500. In particular, graphical indicium 508 is overlaid on section 502. As depicted, graphical indicium 508 is the feedback indicator providing guidance to the vehicle operator to adjust the airspeed of the aircraft. This guidance indicates a corrective action to be performed by the vehicle operator.

In this illustrative example, graphical indicium 508 includes graphical elements in the form of arrow 510 and value 512. Arrow 510 indicates that the airspeed of the aircraft should be increased as a corrective action to be performed by the vehicle operator. As depicted, value 512 indicates a desired airspeed for the aircraft.

Figure 6:
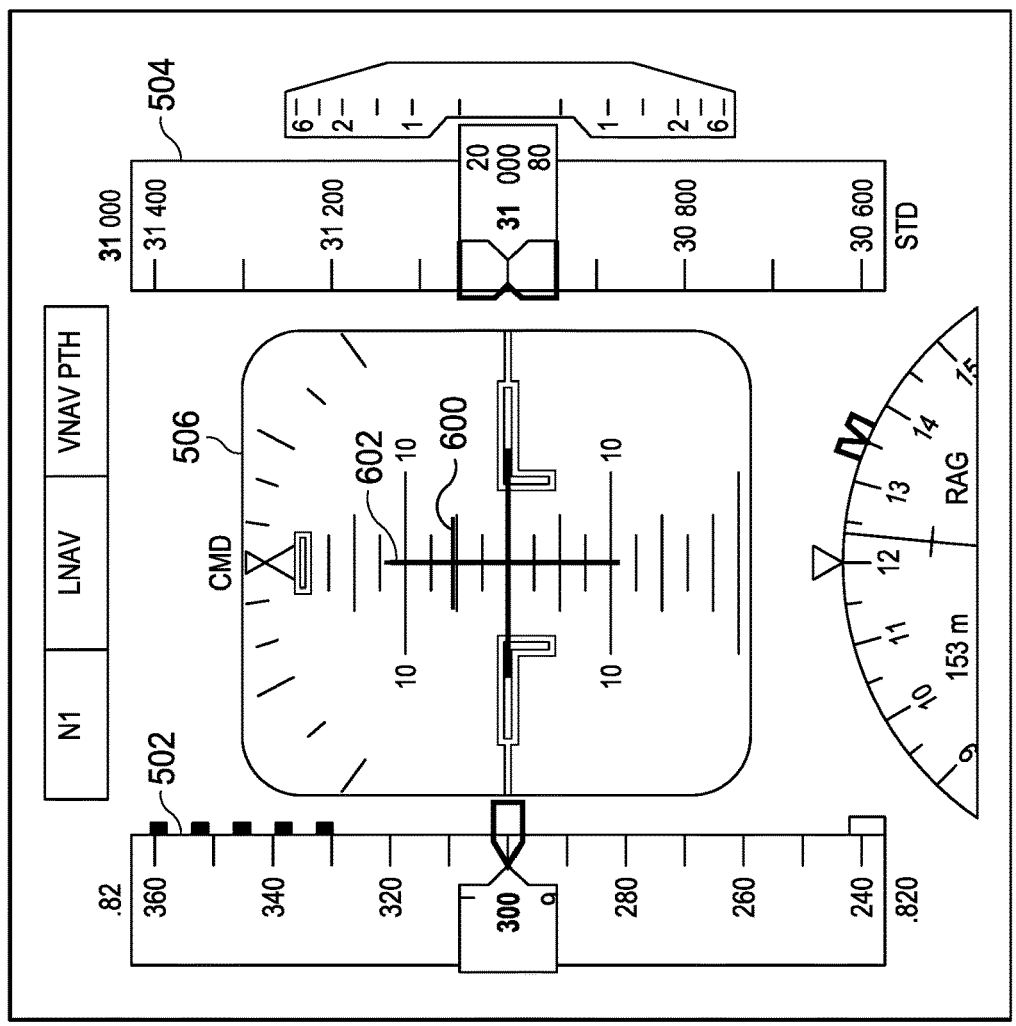
FIG. 6 is an illustration of a graphical user interface with a graphical indicium overlaid on information from a group of hardware systems in accordance with an illustrative embodiment.

With reference next to FIG. 6, an illustration of a graphical user interface with a graphical indicium overlaid on information from a group of hardware systems is depicted in accordance with an illustrative embodiment. In this illustrative example, graphical indicium 600 is overlaid on information displayed in section 506 in graphical user interface 500.

As depicted, graphical indicium 600 takes the form of crosshair 602. In this illustrative example, crosshair 602 indicates a desired attitude for the aircraft. Crosshair 602 is a graphical indicium of a corrective action provided as feedback in the form of guidance for correcting operation of the aircraft. In particular, crosshair 602 indicates a desired change in the attitude of the aircraft.

Figure 7:
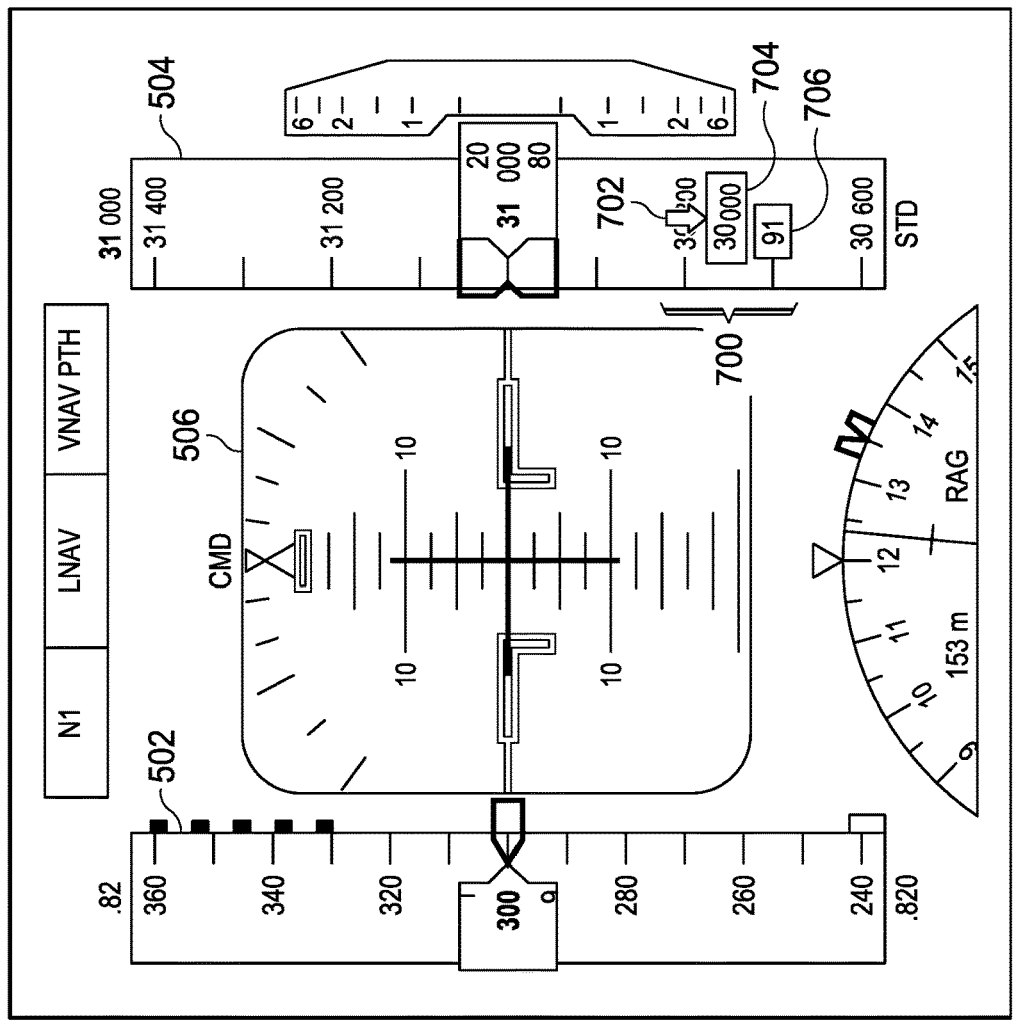
FIG. 7 is an illustration of a graphical user interface with a graphical indicium overlaid on information from a group of hardware systems in accordance with an illustrative embodiment.

With reference next to FIG. 7, an illustration of a graphical user interface with a graphical indicium overlaid on information from a group of hardware systems is depicted in accordance with an illustrative embodiment. In this illustrative example, graphical indicium 700 is overlaid on information displayed in section 504 in graphical user interface 500.

In this illustrative example, graphical indicium 700 overlays real-time information from hardware systems in the aircraft displayed in graphical user interface 500. As depicted, graphical indicium 700 includes graphical elements in the form of arrow 702, value 704 and score indicator 706.

As depicted, graphical indicium 700 is a feedback indicator providing guidance to the vehicle operator to adjust the altitude of the aircraft. This guidance indicates a corrective action to be performed by the vehicle operator.

In this illustrative example, arrow 702 graphically indicates that the altitude for the aircraft should be lowered. The desired altitude is indicated by value 704.

Additionally, score indicator 706 provides an indication of the score for the operation performed. Score indicator 706 may show when the operation is completed or may be shown as the operation is being performed to provide the score that the vehicle operator has so far in performing the operation. For example, score indicator 706 may show a score for a portion, phase, step, or some other part of an operation. In this example, score indicator 706 provides a percentage value as a score.

Figures 8, 9:
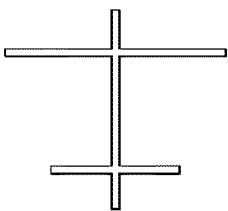
FIG. 8 is an illustration of a graphical user interface with indicating how well a vehicle operator performs an operation in accordance with an illustrative embodiment.
FIG. 9 is an illustration of a graphical user interface indicating how well a vehicle operator performs an operation in accordance with an illustrative embodiment.

Turning next to FIG. 8, an illustration of a graphical user interface with indicating how well a vehicle operator performs an operation is depicted in accordance with an illustrative embodiment. Graphical user interface 800 is an example of an implementation for graphical user interface 200 shown in block form in FIG. 2.

In this example, graphical user interface 800 displays graphical image 802 showing parameters associated with different steps in a loop operation performed by a vehicle operator in an aircraft. In this example, the parameters are time to complete (TTC) 804, speed 806, altitude 808, pitch 810, and roll 812.

In this illustrative example, time to complete (TTC) 804 may include a comparison of the current execution time against the expected time to complete a step. As depicted, speed 806, altitude 808, pitch 810, and roll 812 are parameters received from sensors in the aircraft during performance of the loop operation.

The actual values for the parameters for the loop operation performed by the vehicle operator may be displayed are in column 814. Column 814 indicates values for the parameters present when the vehicle operator performs the loop operation. In this illustrative example, the values may be color-coded to provide a score. For example, green indicates in tolerance, yellow indicates almost out of tolerance, and red indicates out of tolerance. Column 816 indicates values for the same parameters that would be present when the loop operation is performed by an expert vehicle operator. In other words, column 816 may provide a reference or standard, for the loop operation.

In this illustrative example, column 818 displays the values in column 814 that are above or below the target value. In this example, a "+" indicates that the value is above the target value and a "−" indicates that the value is below the target value.

The values in this illustrative example are for parameters in an operation in the form of a loop for an aircraft. The values are shown for a second step out of 4 steps that are performed for the loop operation as shown in column 814 of graphical image 802.

With reference next to FIG. 9, an illustration of a graphical user interface indicating how well a vehicle operator performs an operation is depicted in accordance with an illustrative embodiment. Graphical user interface 900 is example of an implementation for graphical user interface 200 shown in block form in FIG. 2. Graphical image 902 is displayed in graphical user interface 900.

As depicted, graphical image 902 shows altitude 904, speed 906, and pitch 908 for a second step in performing a loop operation. In this illustrative example, altitude 904 and speed 906 are displayed in first color 910 and pitch is displayed in second color 912. First color 910 indicates that the performance value is close to exceeding tolerance for the performance standard and second color 912 indicates that the performance value is within tolerance for the performance standard.

Figures 10, 11:
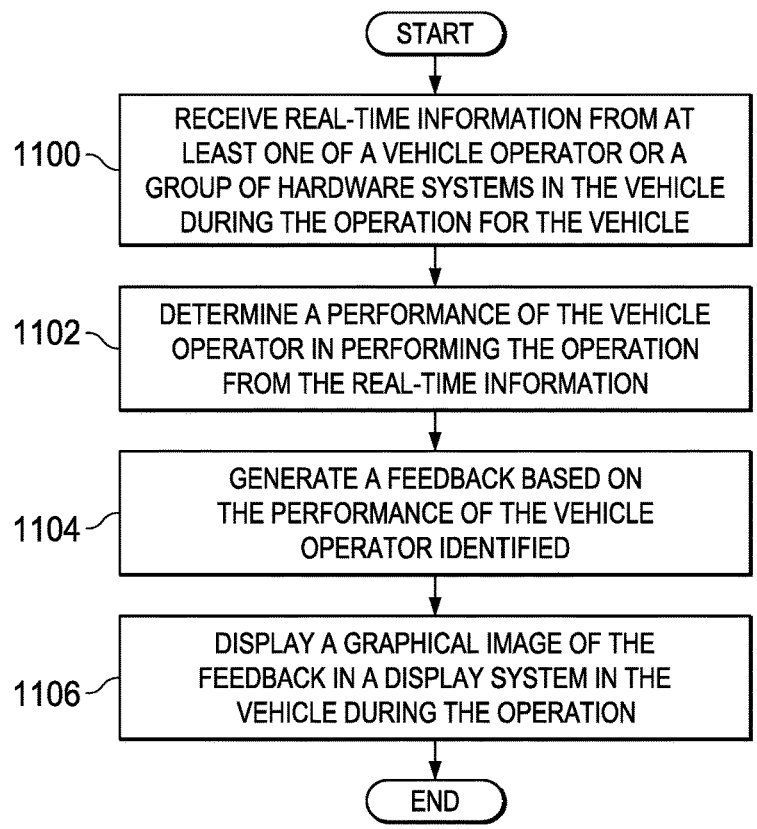
FIG. 10 is an illustration of a graphical user interface indicating how well a vehicle operator performs an operation in accordance with an illustrative embodiment.
FIG. 11 is an illustration of a flowchart of a process for assessing performance of an operation for a vehicle in accordance with an illustrative embodiment.

Turning next to FIG. 10, an illustration of a graphical user interface indicating how well a vehicle operator performs an operation is depicted in accordance with an illustrative embodiment. Graphical user interface 1000 is example of an implementation for graphical user interface 200 shown in block form in FIG. 2.

In this example, graphical user interface 1000 displays graphical image 1002 showing values for parameters for a second step of a loop operation performed by a vehicle operator in graphical image 1002. Graphical element 1003 graphically shows the step in the loop operation in highlighted section 1004. In this depicted example, the parameters are time to complete (TTC) 1005, speed 1006, altitude 1008, pitch 1010 and roll 1012.

The values for these parameters for the loop operation are shown in column 1014. As depicted, column 1014 indicates values for the parameters that occur during the loop operation as performed by the vehicle operator. In this illustrative example, column 1016 indicates values for the parameters when the loop operation is performed by an expert vehicle operator. As shown in this figure, column 1018 displays indications of whether the values displayed in column 1014 are above or below a target value. As depicted, a "+" indicates that the value is above the target value and a "−" indicates that the value is below the target value.

The illustration of the graphical user interfaces in FIG. 5-10 have been provided as examples and are not meant to limit the manner in which illustrative embodiments may be implemented. For example, value 512 may be omitted from graphical indicium 508, and value 704 may omitted from graphical indicium 700. As another example, the amount of change may be indicated by the length of arrow 510 in graphical indicium 508 and the length of arrow 702 in graphical indicium 700. As another illustrative example, one of the graphical indicia in FIGS. 5-7 may be a score without a corrective action.

Turning next to FIG. 11, an illustration of a flowchart of a process for assessing performance of an operation for a vehicle is depicted in accordance with an illustrative embodiment. The process illustrated FIG. 11 may be implemented in training environment 100 in FIG. 1. In particular, the process may be implemented in assessment system 114 in vehicle 102 in FIG. 1.

The process begins by receiving real-time information from at least one of a vehicle operator or a group of hardware systems in the vehicle during the operation for the vehicle (operation 1100). The process determines a performance of the vehicle operator in performing the operation from the real-time information (operation 1102).

The process generates a feedback based on the performance of the vehicle operator identified (operation 1104). In operation 1104, the process may identify a corrective action for the performance of the operation based on the performance of the vehicle operator in performing the operation from the real-time information.

The process displays a graphical image of the feedback in a display system in the vehicle during the operation (operation 1106) with the process terminating thereafter. In operation 1106, the graphical image provides guidance to the vehicle operator in operating the vehicle to perform the operation. The graphical image of the feedback comprises a graphical indicium of a corrective action for correcting the operation of the vehicle while carrying out the operation for the vehicle in which the graphical indicium enables improving performance of the operation for the vehicle by the vehicle operator. In other words, the vehicle operator may perform actions in performing the operation to improve performance of operating the vehicle during the training session.

In this manner, the vehicle operator may increase the performance in performing the operation. In other illustrative examples, operation may be performed again during the same training session based on the corrective action displayed to the vehicle operator.

In other illustrative examples, the display of the graphical image in operation 1106 may be displayed to an instructor. The graphical image may provide guidance to the instructor. In turn, the instructor may provide guidance or directions to the vehicle operator if needed.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

For example, although the different operations have been described as being performed for a training session, the process may be performed at other times. For example, a vehicle operator may also receive this type of feedback during operation of a vehicle at times other than during the training session.

Figure 12:
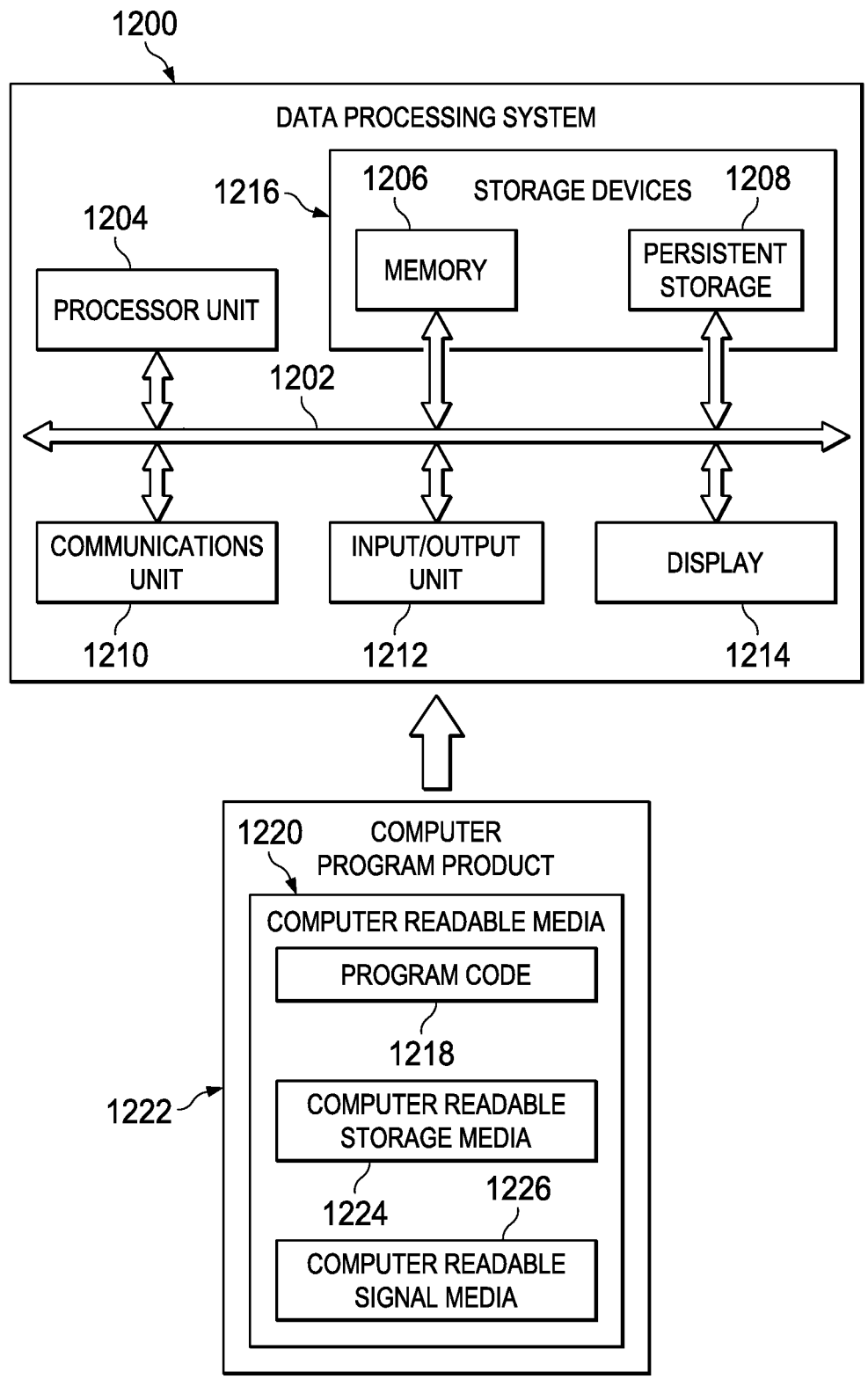
FIG. 12 is an illustration of a block diagram of a data processing system in accordance with an illustrative embodiment.

Turning now to FIG. 12, an illustration of a block diagram of a data processing system is depicted in accordance with an illustrative embodiment. Data processing system 1200 may be used to implement one or more data processing systems in at least one of computer system 118 or computer system 142. In this illustrative example, data processing system 1200 includes communications framework 1202, which provides communications between processor unit 1204, memory 1206, persistent storage 1208, communications unit 1210, input/output (I/O) unit 1212, and display 1214. In this example, communications framework 1202 may take the form of a bus system.

Processor unit 1204 serves to execute instructions for software that may be loaded into memory 1206. Processor unit 1204 may be a group of processors, a multi-processor core, or some other type of processor, depending on the particular implementation.

Memory 1206 and persistent storage 1208 are examples of storage devices 1216. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1216 may also be referred to as computer readable storage devices in these illustrative examples. Memory 1206, in these examples, may be, for example, a random access memory or any other suitable volatile or non-volatile storage device. Persistent storage 1208 may take various forms, depending on the particular implementation.

For example, persistent storage 1208 may contain one or more components or devices. For example, persistent storage 1208 may be a hard drive, a flash memory, a rewritable optical disk, a rewritable magnetic tape, or some combination of the above. The media used by persistent storage 1208 also may be removable. For example, a removable hard drive may be used for persistent storage 1208.

Communications unit 1210, in these illustrative examples, provides for communications with other data processing systems or devices. In these illustrative examples, communications unit 1210 is a network interface card.

Input/output unit 1212 allows for input and output of data with other devices that may be connected to data processing system 1200. For example, input/output unit 1212 may provide a connection for user input through at least of a keyboard, a mouse, or some other suitable input device. Further, input/output unit 1212 may send output to a printer. Display 1214 provides a mechanism to display information to a user.

Instructions for at least one of the operating system, applications, or programs may be located in storage devices 1216, which are in communication with processor unit 1204 through communications framework 1202. The processes of the different embodiments may be performed by processor unit 1204 using computer-implemented instructions, which may be located in a memory, such as memory 1206.

These instructions are referred to as program code, computer usable program code, or computer readable program code that may be read and executed by a processor in processor unit 1204. The program code in the different embodiments may be embodied on different physical or computer readable storage media, such as memory 1206 or persistent storage 1208.

Program code 1218 is located in a functional form on computer readable media 1220 that is selectively removable and may be loaded onto or transferred to data processing system 1200 for execution by processor unit 1204. Program code 1218 and computer readable media 1220 form computer program product 1222 in these illustrative examples.

In one example, computer readable media 1220 may be computer readable storage media 1224 or computer readable signal media 1226.

In these illustrative examples, computer readable storage media 1224 is a physical or tangible storage device used to store program code 1218 rather than a medium that propagates or transmits program code 1218.

Alternatively, program code 1218 may be transferred to data processing system 1200 using computer readable signal media 1226. Computer readable signal media 1226 may be, for example, a propagated data signal containing program code 1218. For example, computer readable signal media 1226 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1200 are not meant to provide architectural limitations to the manner in which different embodiments may be implemented. The different illustrative embodiments may be implemented in a data processing system including components in addition to or in place of those illustrated for data processing system 1200. Other components shown in FIG. 12 can be varied from the illustrative examples shown. The different embodiments may be implemented using any hardware device or system capable of running program code 1218.

Figure 13:
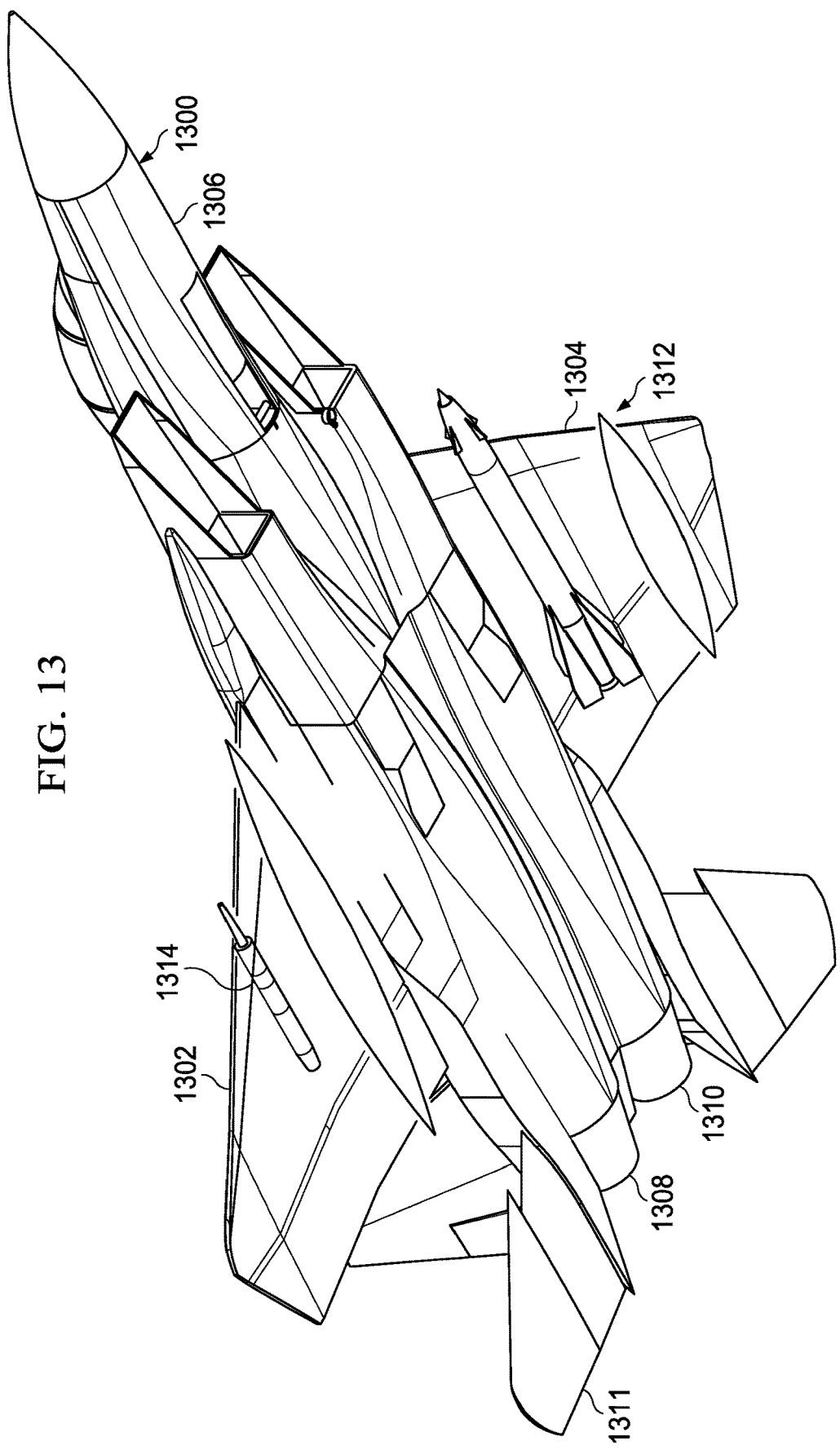
FIG. 13 is an illustration of an aircraft in accordance with an illustrative embodiment.

With reference now to FIG. 13, an illustration of an aircraft is depicted in accordance with an illustrative embodiment. Aircraft 1300 is an example of a physical implementation of aircraft 112 shown in block form in FIG. 1.

In this illustrative example, aircraft 1300 has wing 1302 and wing 1304 attached to body 1306 of aircraft 1300. Engine 1308 and engine 1310 are connected to body 1306. Additionally, aircraft 1300 has tail section 1311. In these depicted examples, aircraft 1300 has pods 1312. In these depicted examples, an illustrative embodiment may be implemented using pod 1314. Pod 1314 may include a training processor such as training processor 300 in FIG. 3.

Figure 14:
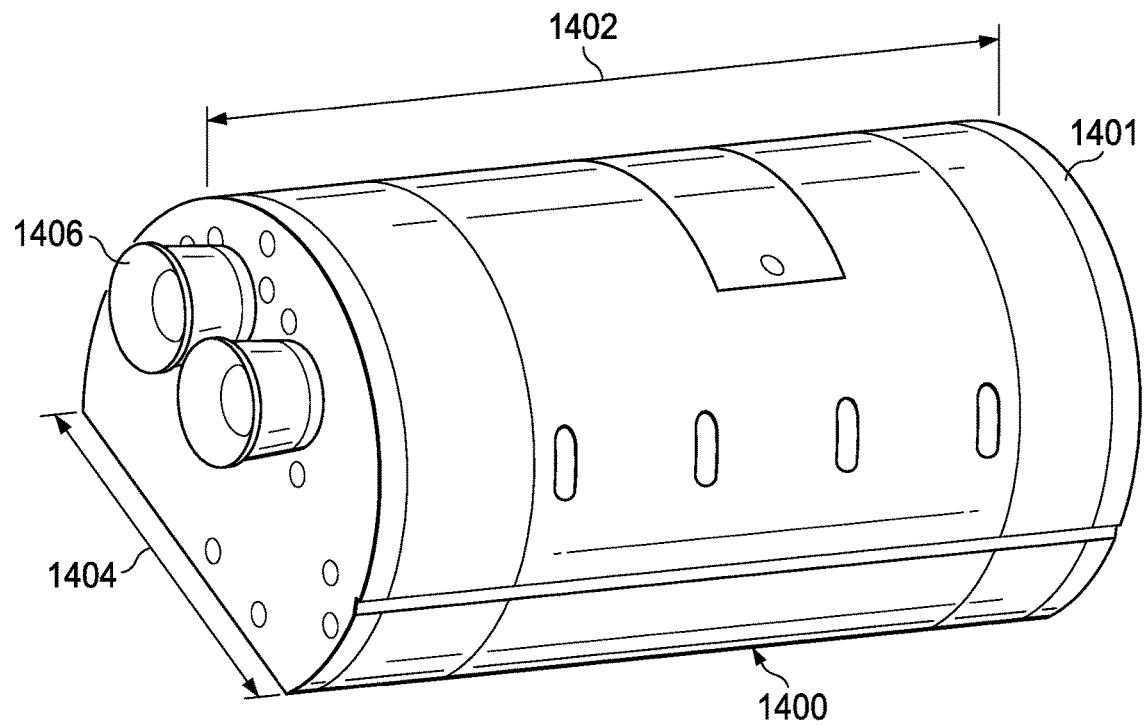
FIG. 14 is an illustration of a training processor in accordance with an illustrative embodiment.

Turning now to FIG. 14, an illustration of a training processor is depicted in accordance with an illustrative embodiment. In this illustrative example, training processor 1400 is an example of an implementation of training processor 300 shown in block form in FIG. 3.

In this illustrative example, training processor 1400 has a shape configured for placement into pod 1314 in FIG. 13. In this example, housing 1401 of training processor 1400 has length 1402 and width 1404. Length 1402 may be, for example, about 8.5 inches. Width 1404 may be about 4.5 inches in this illustrative example. Of course, housing 1401 of training processor 1400 may have any shape that can be placed into a pod such as pod 1314.

Housing 1401 has connectors 1406. These connectors are configured to be connected to a pod interface such as a weapons bus.

Figure 15:
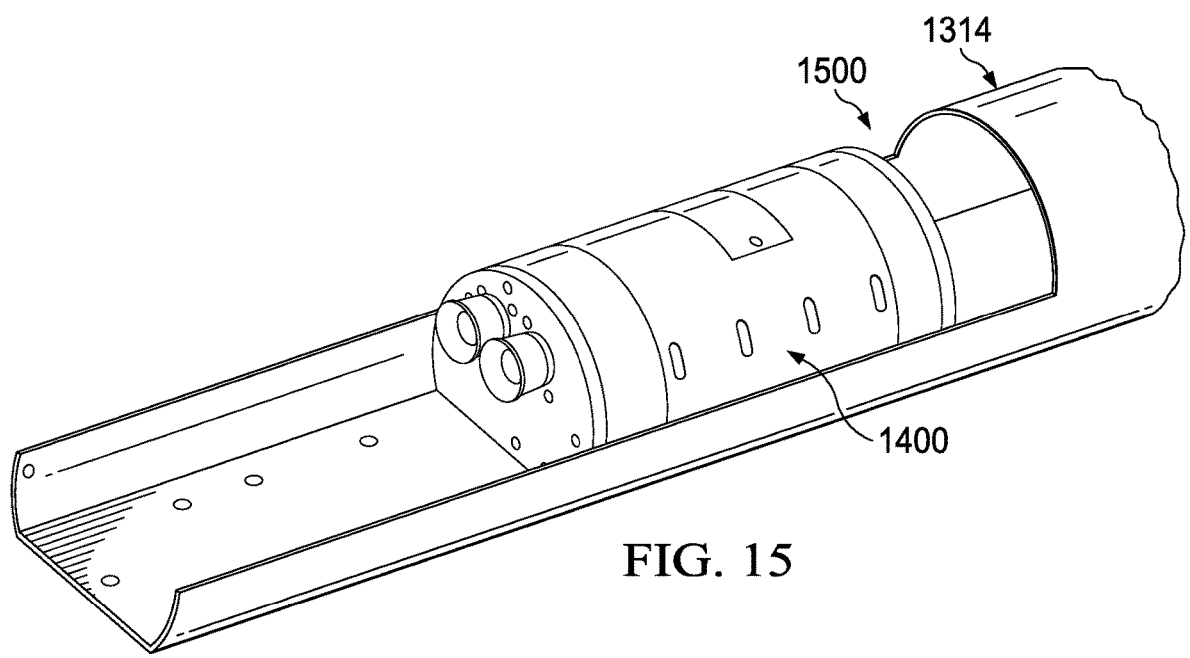
FIG. 15 is an illustration of a training processor in a pod in accordance with an illustrative embodiment.

Turning now to FIG. 15, an illustration of a training processor in a pod is depicted in accordance with an illustrative embodiment. In this illustrative example, training processor 1400 is shown in pod 1314. A cover for pod 1314 has been removed to allow for placement of training processor 1400 into pod 1314. As can be seen, training processor 1400 has a shape configured for placement into interior 1500 of pod 1314. Further, pod 1314 also may include other components used for training exercises in addition to training processor 1400.

Examples of other components that may be present in pod 1314 include, for example, a network interface, a computer, a power supply, a global positioning system receiver, a recording system to record missions for post mission analysis, and other suitable devices.

The illustration of aircraft 1300 and training processor 1400 are not meant to imply physical or architectural limitations to the manner in which an illustrative may be implemented. Other types of aircraft and other shapes for training processors may be used in other illustrative embodiments. For example, although training processor 1400 is shown as a component in a housing that is placed into pod 1314, training processor 1400 may be implemented differently in other illustrative embodiments. For example, training processor 1400 may be built into pod 1314 rather than as a removable component for pod 1314. In this example, pod 1314 may, in essence, be training processor 1400.

Thus, one or more of the different illustrative embodiments may be implemented to improve the manner in which training of a vehicle operator occurs. With the visualization of feedback using a graphical indicium, at least one of a vehicle operator or an instructor may visualize the performance of the vehicle operator in performing an operation for the vehicle. The graphical indicium may provide assessment rating, a corrective action, or some other suitable information that may be useful while the training session is in progress.

With feedback through the graphical indicium, occurring during the training session, a vehicle operator may learn to perform an operation with a desired level of performance faster than compared to obtaining feedback after the training session at a debriefing station on the ground.

With an illustrative embodiment, the length of training and resources used for training a vehicle operator may be reduced. For example, the operation may be repeated during the same training session if needed rather than scheduling another training session in the vehicle when feedback is obtained at a debriefing station on the ground after the training session completes.

The description of the different illustrative embodiments has been presented for purposes of illustration and description and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus that comprises:
a display system, in a vehicle, configured to provide a guidance for a group of input controls;
a processor that comprises:
an assessment system, removably attached to the vehicle, such that the assessment system comprises code specially programmed to:
communicate with the display system;
receive, from sensors in a hardware system in the vehicle, a directional control command and real-time information of a performance of the vehicle during an operation of the vehicle, such that the hardware system comprises at least one of: an environmental control system, a collision avoidance system, and a biometric sensor system for a vehicle operator;

determine, based upon an assessment definition, the real-time information and the directional control command, a performance of the operation; and generate, based upon an event generation based upon a rule in an assessment definition, that looks for the real-time information, in an event generator, a corrective action to improve the performance of the operation of the vehicle during the operation;

a feedback generator configured to transform the corrective action for at least one of: a speed, a heading, a position, an attitude, an altitude, an engine control setting, a communication systems setting, a setting for the hardware system, of the vehicle, to the guidance for the vehicle to perform the corrective action, such that the guidance forms a graphical image; and a platform variable mapping configured to format the graphical image as a graphical indicium overlaid on a display, of the real-time information of the performance of the vehicle during the operation of the vehicle, on the display system, such that the display simultaneously presents the attitude, the speed, and the altitude of the vehicle.

2. The apparatus of claim 1, further comprising the guidance comprising:

real-time guidance to only an instructor display; and the performance comprises real-time performance.

3. The apparatus of claim 1, wherein the graphical indicium comprises a crosshair on the display system.

4. The apparatus of claim 1, further comprising the graphical image provides an assessment rating for the operation for the vehicle.

5. The apparatus of claim 1, wherein the vehicle comprises an aircraft that comprises:

a communications bus in the aircraft; the assessment system configured:

to receive the real-time information from at least a group of hardware systems in the aircraft via the communications bus; and in communication with the display system via the communications bus; and a feedback indicator that comprises the graphical indicium that comprises the guidance, such that the guidance comprises an adjustment, to a performance of a maneuver of the aircraft.

6. The apparatus of claim 1, further comprising the assessment system configured to identify a real-time corrective action for the performance of the operation based on the real-time information about the performance.

7. The apparatus of claim 6, wherein the graphical indicium overlaid on a display of a group of parameters for the operation comprises the guidance, such that the guidance directs the real-time corrective action.

8. The apparatus of claim 7, wherein the vehicle is an aircraft, the group of parameters is an altitude of the aircraft, and the graphical indicium comprises the guidance for at least one of: a direction of a desired altitude, and a value of the desired altitude.

9. The apparatus of claim 1, wherein the real-time information from the hardware system in the vehicle comprises at least one of: an altitude, a yaw, a pitch, a roll, a velocity, a directional velocity, a fuel use, an engine temperature, a heartbeat rate of a vehicle operator, a direction at which the vehicle operator is looking, and a blood pressure of the vehicle operator.

10. The apparatus of claim 1, further comprising the assessment system located in a pod removably attached to the vehicle.

11. A method for guiding a corrective action for a performance of an operation for a vehicle, the method comprising a computer system in the vehicle:

receiving, in an assessment system, a directional control command and real-time information of a performance of the vehicle during an operation of the vehicle, from a sensor for a hardware system in the vehicle during the operation of the vehicle in a session, such that the hardware system comprises at least one of: an environmental control system, a vehicle directional control command, a collision avoidance system, and a biometric sensor system for a vehicle operator;

determining, using the real-time information, the performance of the vehicle performing the operation;

generating, using a rule in an event generator looking for the real-time information, an event;

generating, in the assessment system, a feedback based on the event and the performance of the vehicle, and a guidance comprising a corrective action, for a group of input controls for at least one of: a speed, a heading, a position, an attitude, an altitude, an engine control setting, a communication systems setting, a setting for the hardware system, of the vehicle, improving the performance of the vehicle;

formatting, in a feedback generator, the guidance for displaying, in real time, a graphical image of the feedback in a display system in the vehicle during the operation; and receiving, in a platform variable mapping, the graphical image comprising the guidance and transforming the guidance into a graphical indicium, of the corrective action during the operation, that overlays the corrective action onto a display, of the real-time information from the hardware system, on the display system, such that the display simultaneously presents the attitude, the speed, and the altitude of the vehicle.

12. The method of claim 11, further comprising providing the guidance to at least one of: a vehicle operator display, and an instructor display.

13. The method of claim 11, further comprising displaying the graphical indicium as a crosshair.

14. The method of claim 11, further comprising the graphical indicium providing an assessment rating for the operation.

15. The method of claim 11, further comprising the vehicle comprising an aircraft and the graphical indicium comprising a feedback indicator providing the guidance for adjusting at least one of: the speed, a heading, the position, the attitude, the altitude of the aircraft, the engine control setting, and the setting for the hardware system, while performing a maneuver in the operation for the aircraft.

16. The method of claim 11, further comprising identifying the corrective action for performing the operation based on the real-time information.

17. The method of claim 16, further comprising displaying the corrective action as a crosshair overlaid on a display of a group of parameters for the operation.

18. The method of claim 17, further comprising the vehicle comprising an aircraft, the group of parameters comprising an altitude of the aircraft, and the graphical indicium indicating at least one of: a direction of a desired altitude, and a value of the desired altitude.

19. The method of claim 11, further comprising selecting the real-time information from the hardware system in the vehicle from at least one of: a yaw, a pitch, a roll, a velocity, a directional velocity, a fuel use, an engine temperature, a heartbeat rate of a vehicle operator, a direction at which the vehicle operator is looking, and a blood pressure of the vehicle operator.

20. The method of claim 11, further comprising locating the assessment system in a pod removably attached to the vehicle.

* * * * *